United States Patent
Aberle et al.

(10) Patent No.: US 6,953,100 B2
(45) Date of Patent: Oct. 11, 2005

(54) METHOD AND APPARATUS TO REGULATE THE SUPPLY OF POWER TO AN ELECTRIC DRIVE USING A HYBRID ENERGY SUPPLY SYSTEM IN A VEHICLE

(75) Inventors: Markus Aberle, Dettingen (DE); Joachim Blum, Stuttgart (DE); Mathias Boehmisch, Singen (DE); Thomas Schetter, Goeppingen (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 215 days.

(21) Appl. No.: 10/445,270

(22) Filed: May 23, 2003

(65) Prior Publication Data

US 2004/0065489 A1 Apr. 8, 2004

(30) Foreign Application Priority Data

May 24, 2002 (DE) ......................................... 102 23 117

(51) Int. Cl.⁷ ................................................ B60K 1/00
(52) U.S. Cl. ........................................ 180/65.3; 429/23
(58) Field of Search ...................... 477/7, 2, 3; 363/51; 180/65.1–65.3, 65.8; 701/22; 429/22, 23; 290/40 C; 318/139; 320/101

(56) References Cited

U.S. PATENT DOCUMENTS

| 5,780,980 A | * | 7/1998 | Naito ........................... 318/139 |
| 5,964,309 A | | 10/1999 | Kimura et al. ............. 180/65.8 |
| 6,175,217 B1 | * | 1/2001 | Da Ponte et al. ............. 322/19 |
| 6,214,484 B1 | | 4/2001 | Hauer ............................ 429/9 |
| 6,684,135 B2 | * | 1/2004 | Uenodai et al. ............... 701/22 |
| 6,847,127 B1 | * | 1/2005 | Lee ........................... 290/40 C |
| 6,847,188 B2 | * | 1/2005 | Keskula et al. ............. 320/101 |
| 2002/0064697 A1 | * | 5/2002 | Sugiura et al. ................ 429/23 |
| 2003/0008188 A1 | * | 1/2003 | Aoyagi et al. ................ 429/23 |
| 2004/0048119 A1 | * | 3/2004 | Iwase ........................... 429/22 |
| 2004/0056633 A1 | * | 3/2004 | Sugiura et al. ............. 320/101 |
| 2004/0076860 A1 | * | 4/2004 | Aso .............................. 429/23 |
| 2004/0159480 A1 | * | 8/2004 | Ishikawa et al. ........... 180/65.3 |
| 2005/0048335 A1 | * | 3/2005 | Fields et al. .................. 429/22 |

FOREIGN PATENT DOCUMENTS

| DE | 195 05 431 A1 | | 8/1996 |
| DE | 196 17 548 A1 | | 11/1997 |
| DE | 197 31 250 A1 | | 1/1998 |
| DE | 198 10 467 C1 | | 10/1999 |
| DE | 100 24 259 C1 | | 4/2002 |
| EP | 0 334 474 B1 | | 4/1994 |
| JP | 2003-197231 | * | 7/2003 |
| JP | 2004-146118 | * | 5/2004 |
| JP | 2004-193063 | * | 7/2004 |
| WO | WO 99/67846 | | 12/1999 |
| WO | WO 01/34424 A1 | | 5/2001 |

* cited by examiner

*Primary Examiner*—Bryan Fischmann
(74) *Attorney, Agent, or Firm*—Seed IP Law Group PLLC

(57) ABSTRACT

Regulation of energy supplied to an electric motor from an energy supply system including a fuel cell and an energy storage buffer such as a battery, improves the dynamic response of the motor by adding current from the energy storage buffer to the current from the fuel cell during acceleration.

22 Claims, 10 Drawing Sheets

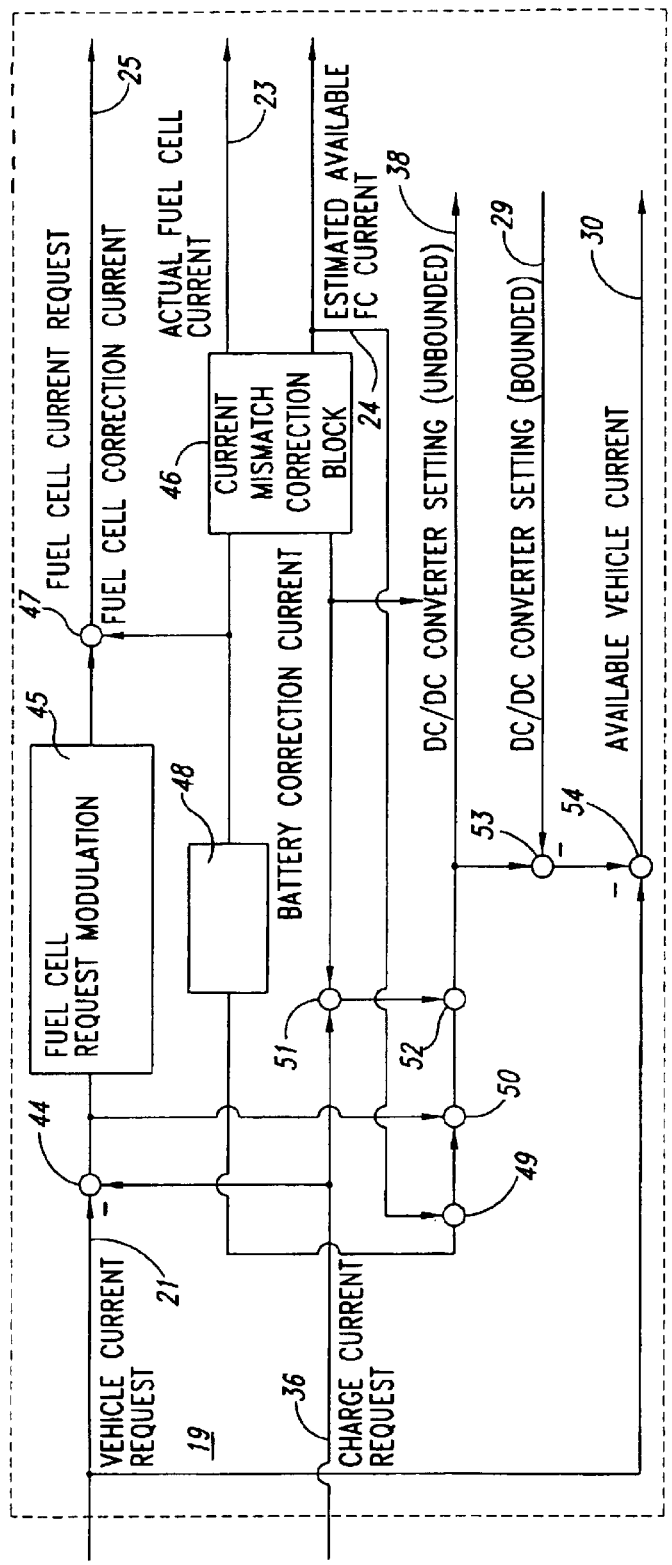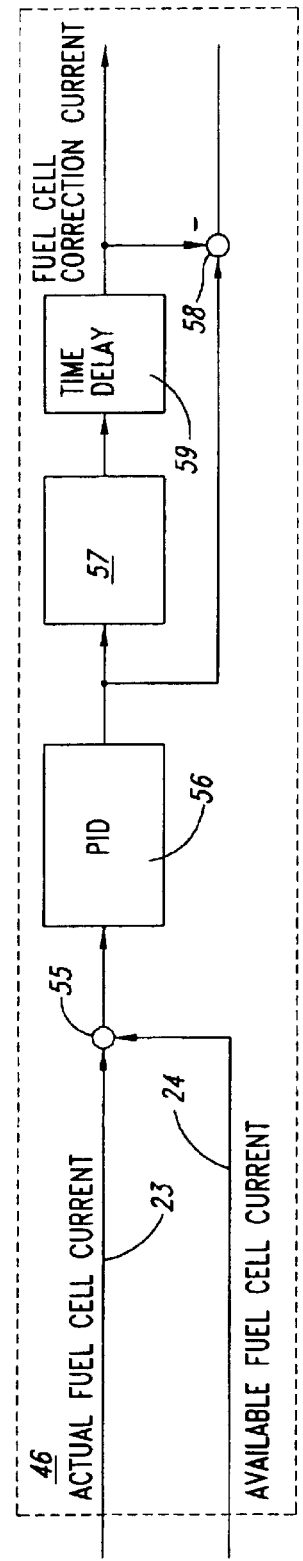
FIG. 5
FIG. 6

METHOD AND APPARATUS TO REGULATE THE SUPPLY OF POWER TO AN ELECTRIC DRIVE USING A HYBRID ENERGY SUPPLY SYSTEM IN A VEHICLE

BACKGROUND OF THE INVENTION

1. Field of the Invention

The invention relates to a method and an apparatus to regulate the supply of energy to an electric drive and other loads using a hybrid energy supply system that comprises a fuel cell and an energy storage buffer, whereby a vehicle control unit regulates the drive power or drive current required by the drive—which is supplied by a power converter—dependent on a throttle position detected by a detector, which determines the energy required by the drive. For the purposes of this invention, the term vehicle also includes other mobile devices, such as for example boats or airplanes.

2. Description of the Related Art

Known in the art is an energy supply system in a vehicle including a fuel cell consisting of individual fuel cell modules and a storage battery that may be connected in parallel to the output of the fuel cell. The fuel cell is supplied with hydrogen-containing fuel from a reformer and with air from a compressor. The reformer receives methanol from a tank and water from a further tank and generates the hydrogen-rich fuel by way of steam reforming. A DC/DC converter, which supplies a drive motor, is connected to receive power from the fuel cell. The drive motor is connected to a control system, which is connected to a sensor indicating the throttle position. Furthermore, the control system is also connected to a control unit for the hybrid energy supply system, which comprises the fuel cell, the reformer, common auxiliaries for the operation of the fuel cell, and the storage battery (DE 197 31 250 A1).

Also known in the art is a hybrid energy supply system to supply an electrical load comprising a fuel cell and a storage battery that is connected to the electrical outputs of the fuel cell, whereby the battery's state of charge is monitored. A control system ensures that after each discharge event the storage battery is recharged in as little time as possible and is available to assist the fuel cell in supplying power to the load (EP 33 44 74 B1).

Also known in the art is a fuel cell arrangement comprising a fuel cell that is supplied by a methanol reformer, and a parallel-connected storage battery, whereby a voltage-amplifier adapter is arranged between the outputs of the fuel cell and the storage battery. The fuel cell system supplies power to a speed control unit with a connected motor. The charge state of the storage battery is monitored. The battery compensates for transient variations in the power output of the fuel cell. The fuel cell operates in a load range with favorable efficiency and—if required—charges the storage battery via the appropriately set voltage-amplifier adapter (U.S. Pat. No. 6,214,484 B1).

In a known fuel-cell-powered energy generating system with a storage battery and a strongly variable electrical load, the charge state of the storage battery, which is connected in parallel to the load, is monitored and compared to a target charge state. In order to maintain the charge state at a preset minimum level, the supply of reactant gases to the fuel cell is increased if so required and a DC/DC converter that is connected on the load side of the fuel cell is regulated appropriately (Patent Abstracts of Japan, Publication Number 0121 18600 A).

In a further known fuel-cell-powered energy generating system, which comprises a fuel cell and a storage battery that is connected in parallel to the fuel cell, the charge state of the battery is monitored. When the energy generating system is powered up, a controller estimates the electrical power requirements of the common auxiliaries by way of the charge state and the gas supply to the fuel cell is adjusted in dependence on this estimate (U.S. Pat. No. 5,964,309).

Also known in the art is a fuel cell system in which a DC/DC converter is connected to the electrical outputs of the fuel cell, whereby the outputs of the DC/DC converter are connected to a battery and an inverter, which supplies power to a motor. A control unit calculates the required power output of the inverter based on the request of an acceleration setpoint generator, determines a high-efficiency operating point for the fuel cell from the characteristic curve of the output voltage of the fuel cell as a function of the output current, and adjusts the power output of the fuel cell and the level of the output voltage of the DC/DC converter so that the power required by the inverter will be supplied by the fuel cell and the battery (WO 99/67 846).

Also known in the art is a motor vehicle that can be driven by an electric motor and includes an energy storage device to supply electrical loads, additional energy sources such as an internal combustion engine, generators, or photovoltaic cells, and a control unit working as energy managing device. The control unit distributes the energy from the energy sources to the electrical loads, if the loads require energy (DE 196 17 548 A1).

Further known in the art is an energy-generating device with a fuel cell in a vehicle, which is equipped with a traction motor, which is connected via a converter to a high-voltage network that is supplied with power by the fuel cell. An on-board low-voltage network includes loads, such as lamps, windshield-wiper motors, etc., and a battery, and is connected to the high-voltage network via a DC/DC converter. Also present is an energy storage buffer, which supplies the energy for the start-up of the fuel cell and is charged during the operation of the fuel cell. In the event of elevated power requirements, the energy storage buffer delivers power to the loads and is charged during braking (WO 01/34424 A1).

Also known in the art is a power-regulating system for motor vehicles that contain an internal combustion engine and a multitude of power-converting components, the individual efficiencies of which can be determined. An overall efficiency is calculated from these individual efficiencies. One parameter for each of the respective components is adjusted to achieve an optimum overall efficiency. In particular, these parameters may include the power output or a variable that is proportional thereto, and/or the rotational speed (DE 195 05 431 A1).

BRIEF SUMMARY OF THE INVENTION

A method and an apparatus are provided to regulate the energy ratios of a hybrid energy supply system comprising a fuel cell, an energy storage device, and at least one motor drive in a vehicle, whereby good response characteristics are achieved even in the event of quick and large-value changes in the power needed by the motor drive, without negative effects on the operation of the fuel cell due to insufficient reactant supply or a reversal of the direction of current flow.

A method of the above-mentioned type implements the following features: The vehicle control unit delivers to the energy supply system a current demand signal (or current request value) that is associated with a respective throttle position detected by a detector; the output voltage of the fuel cell is measured and is checked for whether it exceeds an upper limit value that is still non-critical for the operation of the fuel cell or whether it falls below a lower limit value that is still non-critical for the operation of the fuel cell; in a first operating mode, which relates to acceleration or a constant power requirement of the motor drive, the current or torque of the motor drive is regulated dependent on the detected position of the throttle by a power converter; the power converter is supplied with current by the fuel cell via a DC/DC converter arranged between the outputs of the fuel cell and the storage battery, whereby the DC/DC converter is current-controlled if the fuel cell output voltage is between its limit values in order to raise the current delivered by the fuel cell to the demanded current level; the DC/DC converter is voltage-controlled if the fuel cell output voltage is equal or below its limit value in order to set an output voltage that corresponds to at least the lower limit value; the DC/DC converter is voltage-controlled if the fuel cell output voltage is equal or above its upper limit value in order to set an output voltage that is equal or lower than the upper limit value; in a second operating mode, which relates to decreasing the power requirements of the motor drive and operating the power converter in reverse mode, the DC/DC converter is operated with current-control in reverse mode to charge the storage battery, and the motor drive—if the output voltage is equal to or below its upper limit value—is torque-controlled or current-controlled and —if the output voltage exceeds the upper limit value—is switched to voltage-control to limit the output voltage of the fuel cell to the upper limit value. If a suitable motor is used, then the current-control results in a corresponding control of the torque. The method according to the invention makes it possible in a second operating mode, which corresponds to regeneration, to return energy into the energy storage device without endangering the fuel cell with negative currents. This saves fuel, which results in an increase of the efficiency of the energy supply system. In the first operating mode, the drive current serves to improve the acceleration performance, which results in more favorable response characteristics of the vehicle. This prevents any risk to the function of the fuel cell that would result from too high a current output due a short-term increase of the motor torque. Furthermore, during acceleration, the method according to the invention prevents any risk to the fuel cell function that could arise from admitting negative current, i.e., current from the storage battery, to the fuel cell.

In a preferred embodiment, the vehicle control unit provides a reference input variable, which corresponds to the detected position of the throttle, as torque setpoint or current setpoint—dependent on the operating mode—to a motor control unit. The motor control unit controls the motor drive via the power converter, whereby the motor control unit, taking into account the voltage-current-characteristic of the fuel cell, signals the requested current—needed for the torque called for in the respective operating mode—to a fuel cell control unit. The fuel cell control unit—dependent on the actual current delivered by the fuel cell, the fuel cell current available for the motor drive, and the charge state of the storage battery—issues a current request to the actuators for the air and fuel metering to deliver a corresponding current—taking into account the operating mode, and sets the DC/DC converter to current-control or voltage-control—dependent on the operating mode, and returns the value of the available current to the vehicle control unit. In this embodiment the vehicle control unit can match the requested current, and thus the power to be delivered to the motor, to the respective operating conditions of the energy supply system in such a manner that the motor output will correspond as closely as possible to the detected throttle position at a time determined by the rate of change of the throttle position in coordination with the current contributions of the fuel cell and the storage battery.

The actual current of the fuel cell is determined in a practical manner by measuring the current that is supplied to the power converter and off-setting it against—observing the proper sign—the current contributed by the storage battery. This method does not take into account the currents drawn from the fuel cell by the other loads in the vehicle, so that the control of the motor drive will not be affected.

In a further embodiment, the actual current is estimated by subtracting the currents that are required by the other loads, which are arranged in the vehicle in addition to the drive, from the measured total current at the output of the fuel cell. These additional currents may for example be determined based on the number of turned-on loads and their stored power-consumption data.

In particular, a storage battery control determines the temperature and charge state of the storage battery and signals to the fuel cell control unit a charge or discharge request for the storage battery. The fuel cell control unit issues an adjustment signal for the operating mode of the DC/DC converter. This signal—dependent on the charging or discharging operating mode—is checked and, if applicable, limited to preset maximum values for the charging and discharging current and the voltage. On the one hand the value of the maximum charge current is subtracted from the available current value issued by the fuel cell control unit and is supplied as value of the minimum available current to the vehicle control unit, and on the other hand the value of the maximum discharge current is added to the available current value and is supplied as maximum available current to the vehicle control unit in the first operating mode. As a result of this, the vehicle control unit can take into account the maximum available current values, which are output dependent on the battery charge state, in setting the torque setpoint, which prevents too high a demand on the fuel cell and the storage battery.

In a further preferred embodiment, the requested current value that is output by the vehicle control unit is combined—observing the proper sign—with a charge current value, and is combined with a discharge current value—both values have been output by the battery control unit, whereby for the purpose of achieving good efficiency of the energy supply system, the difference is modulated and is subsequently combined—observing the proper sign—with a fuel cell current correction value. This results in the generation of requested-current values to set the actuators for the air and fuel metering of the fuel cell. This embodiment allows the fuel cell to operate with a favorable efficiency, which saves fuel.

It is practical for the fuel cell current correction value to be determined by determining the difference between the value of the actual current and the estimated available current of the fuel cell. This difference is forwarded to PID control, and subsequently is further transmitted with a rate-of-change limitation and a time delay.

It is especially practical to subtract the fuel cell current correction value from the difference between the actual current of the fuel cell and the estimated available current (which has been forwarded to PID control), and to subtract the difference determined in this manner with a time lag from the value of the requested vehicle current and to apply it to the values of the charge current request and discharge current requests of the battery control unit to generate the setting values for the currents for the DC/DC converter.

Preferably, the difference between the setting value of the current for the DC/DC converter and a limit setting value is applied to the value of the current requested by the vehicle control unit.

The above-mentioned procedural steps allow an excellent dynamic response during accelerating and decelerating, whereby energy released during the regenerative braking is stored.

In a further preferred embodiment, which possesses independent inventive character, the fuel cell and the storage battery are operated with optimized efficiency in accordance with the following relationship:

$$\eta_{OPT}=(\eta_{FC}*\eta_{SB})_{OPT},$$

whereby $\eta_{OPT}$ stands for the overall efficiency, $\eta_{FC}$ stands for the efficiency of the fuel cell, and $\eta_{SB}$ represents the efficiency of the storage battery. The fuel cell efficiency depends on the output current of the fuel cell. The storage efficiency is dependent on the charge current and the discharge current.

Preferably, the battery control unit generates a discharge current request when the charge state has exceeded an upper limit value and a charge current request when the charge state of the storage battery is below a lower limit value. No request for a charge or discharge current is generated when the charge state is between the limit values. Using this procedure, one realizes a mode of operation that is optimally adapted to the different charge states with respect to achieving good efficiency.

In the event of a discharge current request, if the current required by the motor drive is higher than the current generated by the fuel cell at its highest efficiency, the fuel cell generates its highest-efficiency current and the rest of the demanded current is supplied by the storage battery, whereas if the drive requires a current that is lower than the current generated at the highest efficiency, no efficiency-optimized sharing of the current required by the drive between the fuel cell and the storage battery will take place.

In the event of a charge current request, if the current required by the motor drive is greater than zero but smaller than the current generated by the fuel cell at its highest efficiency, the current is generated by the fuel cell in highest-efficiency operation, whereby the storage battery is charged with a current that corresponds to the difference between the required current and the output current of the fuel cell. If the current required by the drive is higher than the current delivered by the fuel cell at its highest efficiency, the fuel cell generates the requested current and the charge current for the storage battery without any efficiency-optimized settings.

An arrangement of the above-described type, provides the following features: the vehicle control unit sends current request signals to the fuel cell control unit in accordance with the detected throttle position and the fuel cell control unit issues to the vehicle control unit signals with information on the available vehicle current as well as the maximum and minimum available vehicle current; a voltage sensor connected to the outputs of the fuel cell is also connected to the fuel cell control unit, which monitors whether the output voltage equals or exceeds an upper limit value that is still non-critical for fuel cell operation or whether the output voltage equals or falls below a lower limit value that is still non-critical for fuel cell operation; in a first operating mode that relates to acceleration or constant speed of the drive that is supplied by the power converter a motor control unit is used to switch it to torque-control or current-control; the fuel cell control unit is used to switch a DC/DC converter—that on one side is connected to the inputs of the power converter and the outputs of the fuel cell and on the other side is connected to the storage battery—to current-control if the output voltage is between the limit values; it sets the DC/DC converter to generate an output voltage that corresponds to at least the lower limit value if the output voltage is equal to or below the lower limit value, and it sets the DC/DC converter to generate an output voltage that corresponds to the upper limit value if the upper limit value is reached or exceeded; in a second operating mode that relates to the dynamic reduction of the power requirements of the motor drive during the reverse operation of the power converter, the DC/DC converter is switched to current-control and the drive is switched to voltage-control with the upper limit value as the maximum value if the output voltage equals or exceeds the upper limit value; the fuel cell control unit includes a current management program, which processes the values of the actual, measured, or estimated fuel cell current and of the estimated available fuel cell current, as well as the signals representing the charge state of the storage battery obtained from a battery control unit to generate values for setting the actuators of the components serving in the supply of air and fuel and in the generation of fuel.

BRIEF DESCRIPTION OF THE DRAWINGS

The invention is described in more detail in the following by way of an embodiment example shown in a figure, illustrating further details, features, and benefits.

FIG. 5 is a block diagram of the design of a current management system in the fuel cell control unit.

FIG. 6 is a block diagram of the design of a correction system for current mismatches.

DETAILED DESCRIPTION OF THE INVENTION

Figure 1:
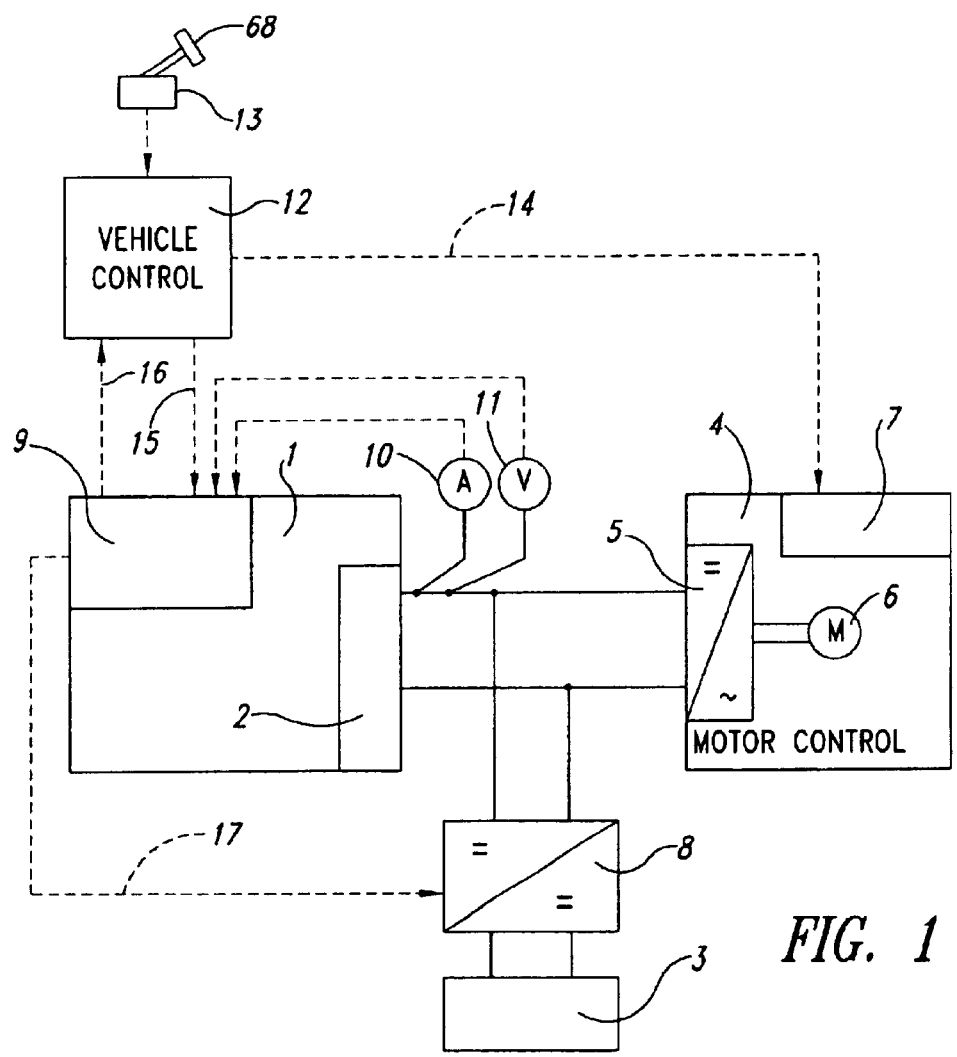
FIG. 1 is a block diagram of an apparatus comprising a hybrid energy supply system that supplies an inverter, with a linked motor drive in a vehicle.

An electric vehicle (not shown in any detail) includes a hybrid energy supply system, which comprises a fuel cell system 1 including a fuel cell 2, and a storage battery 3. In place of the storage battery 3, it is possible to use a supercapacitor or a flywheel with a motor/generator. The electrical outputs of the fuel cell 2 are connected to a motor drive unit 4, which comprises a bi-directional power converter or inverter 5, a series-connected motor 6 for vehicle propulsion—connected to the power converter outputs, and further comprises a motor control unit 7 to control or regulate the power of the motor 6 via the inverter 5.

Connected to the outputs of the fuel cell 2 and the inputs, i.e., the DC side, of the inverter 5, is one side of a direct current/direct current converter 8, hereafter referred to as DC/DC converter. The other side of the DC/DC converter 8 is connected to the storage battery 3. The fuel cell system 1 includes a fuel cell control unit 9. The output current of the fuel cell 2 is measured by a current sensor 10 while the output voltage is measured by a voltage sensor 11. The voltage sensor 11 is connected to the fuel cell control unit 9. The current sensor is connected to the fuel cell control unit 9.

A vehicle control unit 12 is connected to a detector 13, which may be a detector that detects the position of the throttle 68 (for example, an accelerator pedal or some similar adjustment device). The throttle positions are associated with specific torques of the motor drive 4, i.e., the detector 13 specifies the setpoint values for the torque of the motor 6. Consequently, the acceleration and deceleration of the vehicle are controlled by means of the throttle 68.

The vehicle control unit 12 controls the motor control unit 7 via suitable signals by inputting the level of torque or of a variable corresponding to the torque, e.g. the current for certain motor types, as setpoint value to the motor control unit 7. This active link between the vehicle control unit 12 and the motor control unit 7 is indicated by a dashed line 14 in FIG. 1. Both the vehicle control unit 12 and the motor control unit 7 contain processors with the corresponding peripherals.

The vehicle control unit 12 and the fuel cell control unit 9 work together. In particular, the vehicle control unit 12 issues values of the requested current to the fuel cell control unit 9. This function is represented by the dashed line 15 of FIG. 1. The vehicle control unit 12 uses the respective signal of the detector 13 to determine the value of the requested current. The fuel cell control unit 9 monitors the fuel cell 2 and, among other functions, determines the available current, which it then signals to the vehicle control unit 12. This data link is represented by the dashed line 16 in FIG. 1.

The fuel cell control unit 9 sets the operating mode of the DC/DC converter 8, in particular the current direction, the current-control, or the voltage-control. This data link between the fuel cell control unit 9 and the DC/DC converter is represented by the dashed line 17 in FIG. 1.

Figure 2:
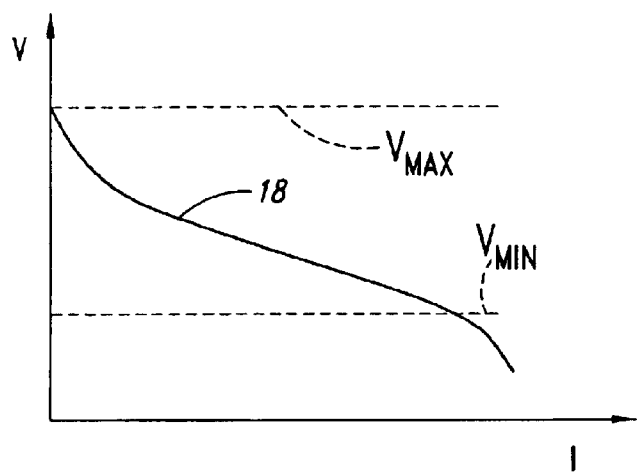
FIG. 2 is a graph of the output voltage of a fuel cell belonging to the hybrid energy supply system as a function of the output current of the fuel cell.

The graph of FIG. 2 shows the typical shape of the fuel cell output voltage as a function of the fuel cell current I. The voltage V is plotted along the y-axis, while the current I is plotted along the x-axis. The characteristic curve 18 of the voltage V as a function of the current I is non-linear in some areas, in particular just below the no-load voltage and above a specific load current.

The range of the characteristic that is non-critical for the operation of the fuel cell 2, i.e., for the energy supply of electrical loads, is the range between the no-load voltage V and the start of the curvature at high currents. For this reason one aims for an operation in which the fuel cell is not subjected to any voltages higher than the no-load voltage, hereafter referred to as $V_{max}$, and in which the voltage does not fall below the voltage $V_{min}$ at the maximum permissible current.

Since the fuel cell 2 needs a certain response time to react to a change in the requested torque, the storage battery 3 supplies current to the inverter 5 to help the motor 6 to respond to rapid changes of the torque setpoints or current setpoints.

The energy supply system and the motor 6 are controlled so that no voltages above the limit value $V_{max}$ or below the limit value $V_{min}$ will be available at the outputs of the fuel cell 2.

The vehicle control unit 12 uses the throttle position detected by the detector 13 and the setting of the torque setpoint to determine the required torque change, which may relate to the acceleration or deceleration of the vehicle or to constant speed. The working principle of the apparatus shown in FIG. 1 during acceleration or constant speed of the motor 6 is referred to as the first operating mode.

In the event of acceleration or constant speed, the motor 6 is torque-controlled or current-controlled by the inverter 5. The vehicle control unit 12 requests from the fuel cell control unit 9 that the energy supply system generate a current corresponding to the new torque. In the first operating mode, the fuel cell control unit 9 checks the output voltage of the fuel cell 2 or the voltage of the lines between the fuel cell 2 and the inverter 5 for three criteria, in particular: is the voltage between the limit values $V_{max}$ and $V_{min}$, is the voltage lower than the lower limit value $V_{min}$, or is the voltage higher than the upper limit value $V_{max}$.

If the voltage of the fuel cell $V_{FC}$ is in the range $V_{max} < V_{FC} < V_{max}$, the DC/DC converter 8 will be current-controlled during acceleration of the motor 6. If the fuel cell voltage $V_{FC}$ is at or below the voltage $V_{min}$, the DC/DC converter 8 will be operated with voltage-control in a manner so that the voltage at the Outputs of the fuel cell 2 will be maintained at a value no lower than $V_{min}$. This voltage control in particular includes the regulation of the output voltage to the value $V_{min}$. If the voltage at the output of the fuel cell 2 is at or above the maximum permissible voltage $V_{max}$, then the DC/DC converter 8 will be voltage-controlled in a manner so that its output voltage will not be higher than the value of $V_{max}$.

This means that in the event of rapid torque increases the DC/DC converter 8 feeds current to the inverter 5, in addition to the current delivered by the fuel cell 2, since in the event of rapid changes the fuel cell current can not be increased in the required short time. During this, the DC/DC converter 8 is also used to ensure that the voltage will not be outside of the range established by the limit values $V_{max}$ and $V_{min}$. Consequently, a breakdown of the fuel cell 2 due to lack of fuel or due to negative currents, i.e., cell reversal, can be prevented.

The vehicle control unit 12 also uses the throttle position detected by the detector 13 and the torque setpoint or current setpoint entered into the motor control 7 to determine whether the current requirement of the power converter or inverter 5 is less than zero. In this operating mode, which is referred to as the second operating mode, the inverter 5 and the DC/DC converter 8 are set to reverse operation, i.e., the reverse operation of the inverter 5 brakes the motor 6 and the current provided by the inverter 5 is fed to the storage battery 3 via the DC/DC converter 8. In the second operating mode, the DC/DC converter is always current-controlled. Simultaneously, the voltage at the output of the fuel cell 2 is monitored to determine whether it exceeds or falls below the critical upper limit value $V_{max}$. If the voltage is lower than $V_{max}$, the power of the motor 6 will be reduced to the lower torque value by means of torque-control or current-control. If the voltage exceeds the upper limit value, then the braking takes place by way of voltage-control of the motor 6 by means of the inverter 5. This prevents negative currents from being supplied to the fuel cell 2.

Figure 3:
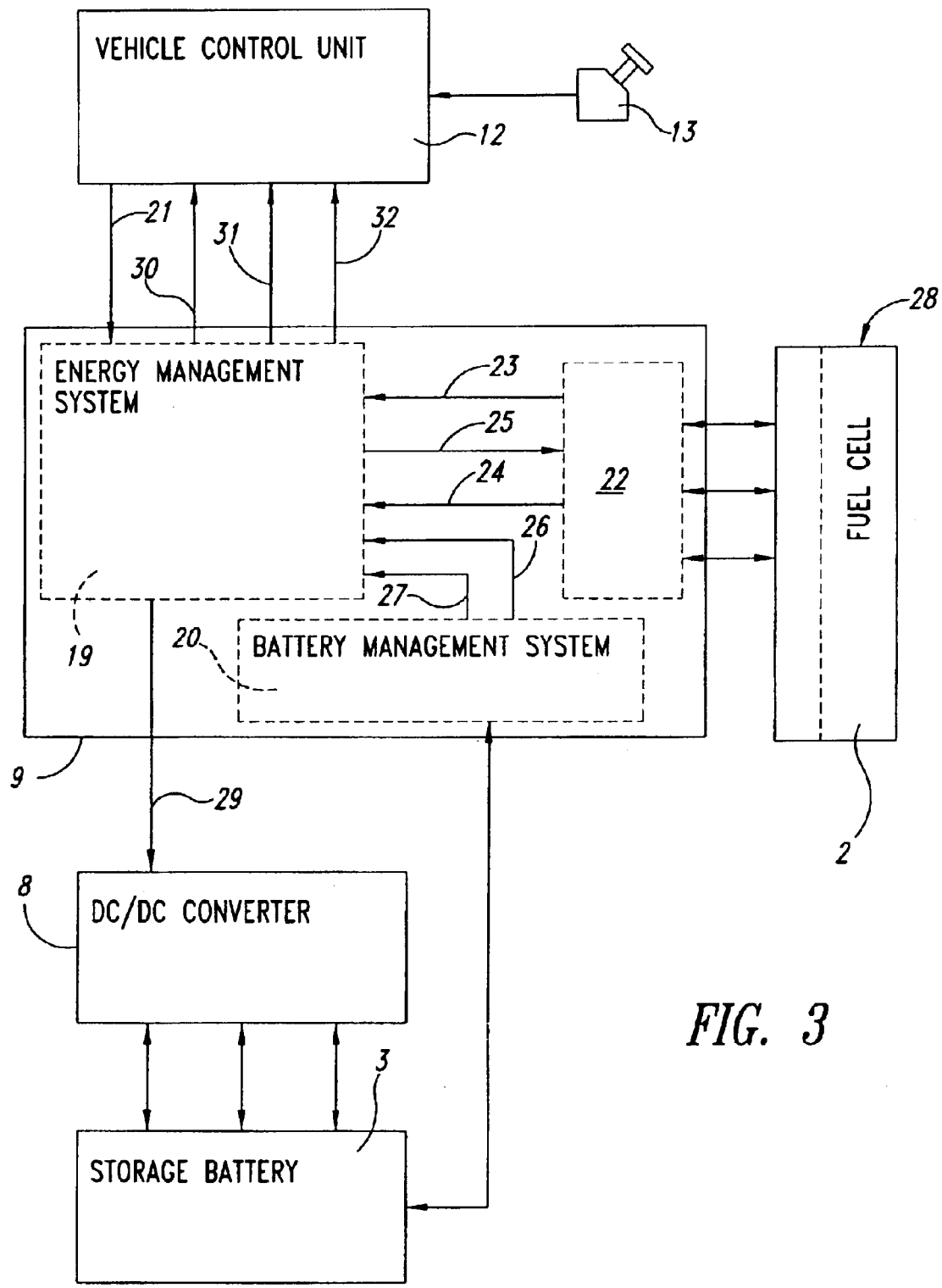
FIG. 3 is a block diagram of a vehicle control unit and a fuel cell control unit with a fuel cell system and a DC/DC converter connected to a storage battery.

FIG. 3 shows in more detail, the fuel cell control unit 9 of the apparatus shown in a block diagram in FIG. 1. The fuel cell control unit 9 comprises an energy management system 19 and a battery management system 20. The vehicle control unit 12, which uses the throttle position values measured by the detector 13 to establish the torque setpoint values for the motor 6, also calculates the required current to be supplied to the motor 6 in the form of current request values, which have to be raised by the energy supply system from the fuel cell 2 and the storage battery 3. For this reason, the vehicle control unit 12 provides the values of the requested vehicle current to the energy management system 19 via a line 21.

The energy management system 19 obtains the values of the actual current of the fuel cell 2 via a line 23 from a signal-processing unit 22 within the fuel cell control unit 9. The values of the current available from the fuel cell 2 are supplied to the energy management system 19 via a line 24.

The battery management system 20, which is connected to sensors (not shown) to detect the charge state of the storage battery 3, uses a line 26 to signal the charge state, and a line 27 to signal the temperature of the storage battery to the energy management system 19. The signal-processing unit 22 detects the actual current of the fuel cell 2 that is part of the fuel cell system 1, which also includes common auxiliaries, the actuators for the gas supply of the fuel cell—in this embodiment a solid polymer fuel cell, a reformer (if present), and the fuel tanks (if present). This fuel cell system 1 is also referred to herein as "fuel cell", which is intended to denote all of the components that are necessary for the operation of the actual fuel cell.

The actual current of the fuel cell 2 can be measured or estimated. The current available for the drive is mostly estimated, since it does not include those currents that are supplied to other loads in the vehicle and are not measured to reduce the complexity of the measuring equipment. The signal-processing unit 22 uses the values of the requested fuel cell current to generate the signals for the actuators of the fuel cell system 1 to induce the fuel cell 2 to deliver the requested current.

The energy management system 19 uses a line 29 to control the setting of the DC/DC converter 8, which is voltage-controlled or current-controlled depending on the operating mode and feeds current into the inverter 5 or is charged by current from the inverter 5. In the case when current is fed into the inverter 5, the DC/DC converter 8 increases the current delivered by the fuel cell 2 to the level of the current required by the drive during acceleration.

The energy management system 19 uses lines 30, 31, 32 to signal the available current, the maximum available current, and the minimum available current, respectively, of the fuel cell 2. The lines that are labelled 21, 23, 24, 25, 26, 27, 29, 30, 31, and 32 in FIG. 3 could also be replaced by one or more busses. The vehicle control unit 12 and the fuel cell control unit 9 each contain one or more processors. Consequently, the term energy management system 19 refers to the processor and the associated software. The equivalent applies to the battery management system.

Figure 4:
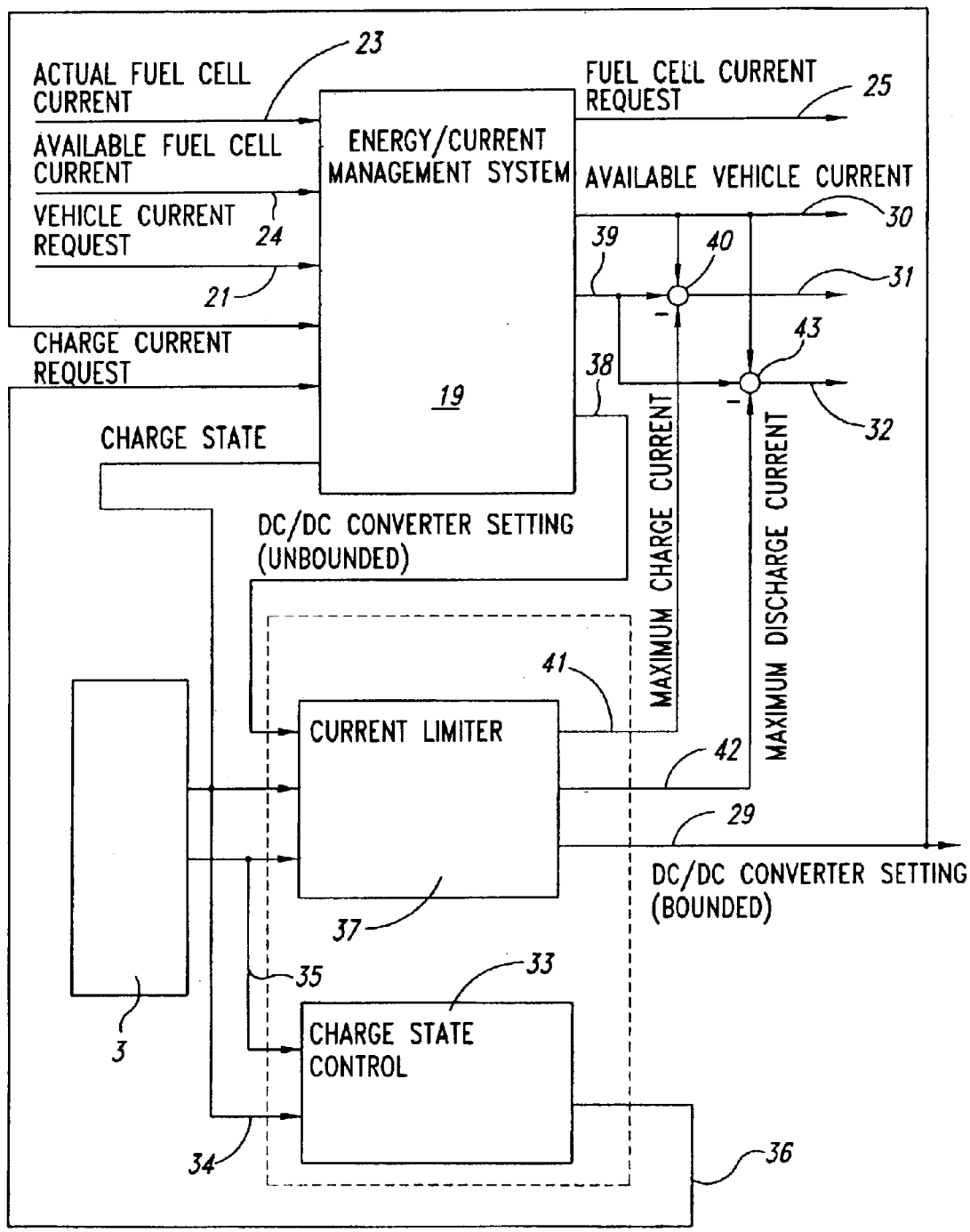
FIG. 4 is a block diagram with details of the fuel cell control unit.

FIG. 4 provides a more detailed view of the signals and data in connection with the energy management system 19 and the battery management system 20. The energy management system 19, which in particular processes and outputs current data, can also be referred to as a current management system. The battery management system 20 comprises a charge state control 33 and a battery current limiter 37. The actual fuel cell current is signalled to the energy management system 19 via the line 23. The line 24 is used to notify the energy management system 19 of the available fuel cell current, i.e., the current that is available to the motor control 7. The available current is estimated using the current consumption of the other loads (not shown) in the vehicle. The data on the requested vehicle currents is provided to the energy management system 19 via the line 21.

Due to its connection to sensors (not shown) at or in the storage battery 3, the charge state control 33 is provided with measured values via a line 34, whereby the measured values show or may be used to calculate the charge state of the storage battery. Furthermore, the temperature of the storage battery 3 is signalled to the charge state control 33 via a line 35. The energy management system 19 is provided with the data on the charge state of the storage battery 3 from the charge state control 33 via the line 34.

The charge state control 33 uses the level of the detected charge state to determine the required charge current or discharge current and provides the corresponding values of the current needed for the charging or discharging to the energy management system 19 via the line 36.

A battery current limiter 37 specifies the limits for the charge currents and discharge currents. The battery current limiter 37 also is provided with the data on the charge state and temperature of the storage battery 3.

The energy management system 19 uses the data on the actual fuel cell current, the available fuel cell current, the requested vehicle current, the charge state, and the charge current request to determine the operating mode and setting of the DC/DC converter 8 and outputs the corresponding data via a line 38 to the battery current limiter 37, which compares the setting specified by the energy management system 19 to the limit values of the charge currents. Tuned to the limit values of the charge currents, an upper limit value for charging and a lower limit value for discharging, the current limiter issues an adjusting signal for the DC/DC converter 8 via the line 29. The setpoint adjustment for the DC/DC converter is also signalled to the energy management system 19.

The energy management system 19 uses the above-listed data to calculate the values for the fuel cell current request and transmits these values via the line 25 to the signal-processing unit 22, which uses them to generate actuating signals for components for fuel generation and air supply of the fuel cell 2. The energy management system 19 uses the line 30 to transmit values of its calculated value of the available vehicle current, which is received and processed by the vehicle control unit 12. Using values of the actual measured or estimated fuel cell current, which reach the energy management system 19 via the line 23, and using values of the estimated available current, which are transmitted via the line 24, the energy management system 19 calculates values of a battery correction current, which are output on a line 39. In a summing point 40, the values of the available vehicle current, which have been transmitted via the line 30, are added to the values of the maximum charge current issued by the current limiter 37 via a line 41. The value of the battery correction current is subtracted from this sum. The result of the superposition of current values in the summing point 40 is transmitted to the vehicle control unit 12 as the minimum available vehicle current. The current limiter issues values of the maximum discharge current via a line 42. The values of the available vehicle current and the values of the battery correction current are superimposed in a summing point 43. The values of the maximum discharge current are subtracted from this sum. The result is transmitted via the line 32 to the vehicle control unit 12 as the maximum available vehicle current.

The processing of current values, which have been fed to the energy management system 19, to generate output values will be explained in more detail in the following with reference to FIGS. 5 and 6. The values of the current requested by the vehicle control unit 12 are sent via the line 21 to the energy management system 19, where they are combined in a summing point 44 with the negative values of the charge current request that have been transmitted via the line 36. The difference of these values is applied to a module 45 of the fuel cell request modulation, which will be explained in more detail below.

The values of the actual fuel cell current are transmitted along the line 23, and the values of the estimated available fuel cell current are transmitted along the line 24 to a current-mismatch correction block 46, which has two outputs. From one of the outputs the values of the fuel cell correction currents are transmitted to a summing element 47 and a time-delay block 48. In the summing element, the values from the output of the fuel cell modulation block 45 are superimposed on the values of the fuel cell correction currents.

The sum is output as the fuel cell current request on line 25 and is transmitted to the signal-processing unit 22. The time delay in the time-delay block 48 is tuned to the time that is required to calculate the available current from the requested fuel cell current. The output values of the time-delay block 48 are applied to a summing element 49, where they are subtracted from the values of the estimated available fuel cell current. The difference, i.e., the values of the estimated available current without the value of the fuel cell correction current, reach a summing point 50, where they are subtracted from the difference values between the vehicle current request and the charge current request, which results in a compensation for the slow fuel cell response.

The current-mismatch correction block 46 also calculates a battery current correction value, which is fed to a summing element 51, where it is combined with the values of the charge current request. The sum obtained in the summing element 51 then reaches a further summing element 52, where it is applied to the values arriving from the summing element 50, which results in the generation of the values for the DC/DC converter setting (unbounded), which are transmitted on the line 38. These values are at the same time fed to a summing element 53, where the values of the DC/DC converter setting (bounded) that have been transmitted via the line 29 are subtracted from these values. The result of this difference reaches a summing element 54 and is subtracted from the values of the vehicle current request, which establishes the values of the available vehicle current, which are then transmitted to the vehicle control unit 12 via the line 30.

FIG. 6 is a block diagram of the design of the mismatch correction block 46. The values of the actual fuel cell current, which have been obtained by measurement or estimate and are transmitted via the line 23, are applied to a summing point 55, where the values of the estimated fuel cell current that is available for the drive—that have been transmitted via the line 30—are subtracted from the actual fuel cell current values.

The difference obtained in this manner is forwarded to a PID block 56, the output values of which are fed to a slew rate limiter block 57 and a summing point 58. The output values of the slew rate limiter block 57 reach a time-delay block 59, at the output of which will be available the values of the fuel cell correction current, which are then in the summing point 58 subtracted from the values arriving from the output of the PID block 56, which results in the generation of the values of the battery correction current.

Figure 7A:
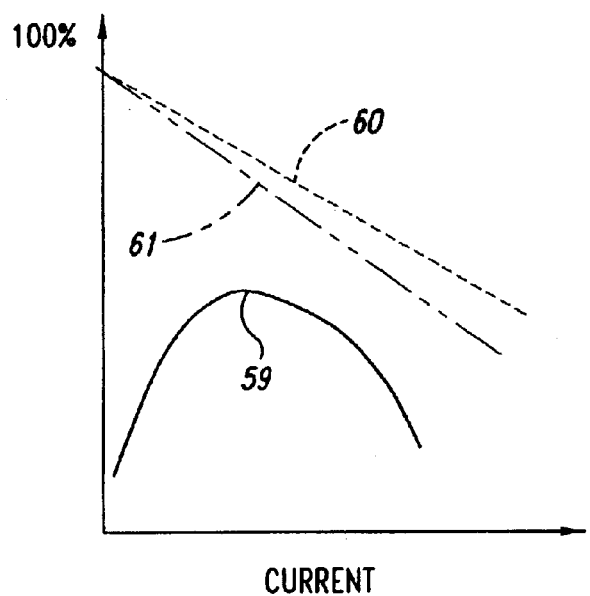
FIG. 7a is a graph of the typical characteristic of the efficiency of the fuel cell as a function of the current.

FIG. 7a illustrates the typical efficiencies of a fuel cell and a storage battery as functions of the current. The efficiency is plotted along the y-axis while the current is plotted along the x-axis. The label 59 in FIG. 7a indicates the efficiency characteristic of the fuel cell. The charging efficiencies of the storage battery 3 are labelled 60 and are shown by the dashed line in FIG. 7a. The discharging efficiency of the storage battery 3 is labelled 61 and is shown by the dot-dashed line in FIG. 7a.

Figure 7B:
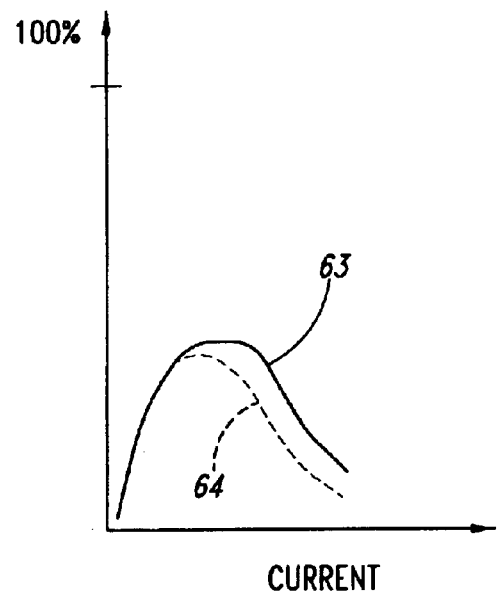
FIG. 7b is a graph of the typical characteristic of the efficiency of a storage battery as a function of the current during charging and discharging.

In FIG. 7b, the overall efficiency of the fuel cell 2 and the storage battery 3 for charging is labelled 63, while the overall efficiency of the fuel cell and the storage battery for discharging is labelled 64.

The energy management system 19 divides the vehicle current request into a fuel cell current request and a storage battery current request, which is accomplished by adjusting the DC/DC converter 8. Dividing the requested vehicle current between the fuel cell 2 and the storage battery 3, while taking into consideration the efficiencies of the fuel cell 2 and the storage battery 3, makes it possible to achieve an efficiency-optimized system operation so that one achieves an optimum overall efficiency.

Figure 8:
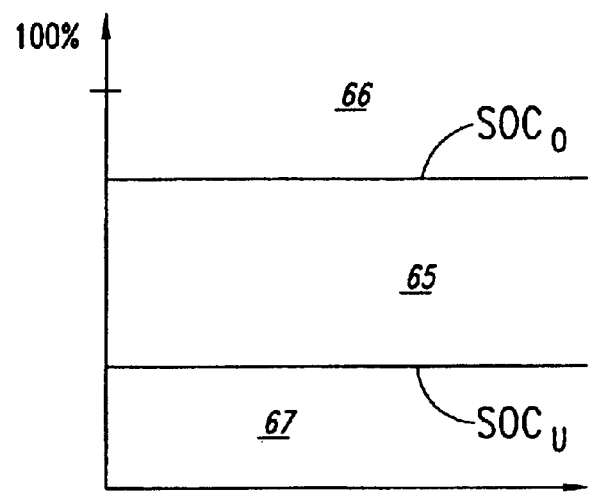
FIG. 8 is a diagram of control ranges for the efficiency-optimized operation of the hybrid energy supply system.

By depending on the charge stage of the battery, it is practical to subdivide the system operation into ranges, which are shown in FIG. 8. FIG. 8 shows a range 64 in which no charge request has been issued, since the battery charge state is between an upper charge limit value SOCo and a lower charge limit value SOCu. FIG. 8 shows the charge state of the storage battery 3 as a percentage along the y-axis and the ranges along the x-axis. Specifying the two boundary limits SOCo and SOCu defines the ranges 66 and 67 in addition to the range 65. The system management strategies are based on the ranges 65, 66, and 67. The optimum overall efficiency is determined according to the equation:

$$\eta_{OPT} = (\eta_{FC} * \eta_{SB})_{OPT}$$

whereby $\eta_{OPT}$ is the overall efficiency, $\eta_{FC}$ is the efficiency of the fuel cell system 1, and $\eta_{SB}$ is the efficiency of the storage battery 3. If the battery management 20 has issued a discharge request on account of the charge state being in the range 66, then the following strategy is used to obtain a high overall efficiency:

1. If the requested vehicle current is higher than the current of the fuel cell 2 at its highest fuel cell efficiency, then the fuel cell 2 is set to deliver this latter current. The current to be requested by the storage battery 3 is obtained as the difference of the requested vehicle current and the current of the fuel cell 2 at optimum efficiency.

2. On the other hand, if the requested storage battery current is smaller than a minimum discharge current, then this discharge current is set. If the requested vehicle current is greater than zero but smaller than the current of the fuel cell 2 at its optimum efficiency, then the energy supply system will be operated without an optimum-efficiency strategy.

If the battery management 20 requests a charge current on account of the charge state being in the range 67, then two different procedures are implemented again, in dependence on the level of the requested vehicle current.

If the requested vehicle current is larger than the current of the fuel cell 2 at its highest efficiency, then the fuel cell current will not be set to a specific value. The fuel cell current is obtained from the difference of the requested vehicle current and the storage battery current. If the requested vehicle current is larger than zero but smaller than the fuel cell current at the highest fuel cell efficiency, then the fuel cell current is set to the value with the highest fuel cell efficiency. The storage battery current is set to the difference between the requested vehicle current and the fuel cell current.

Figure 9A:
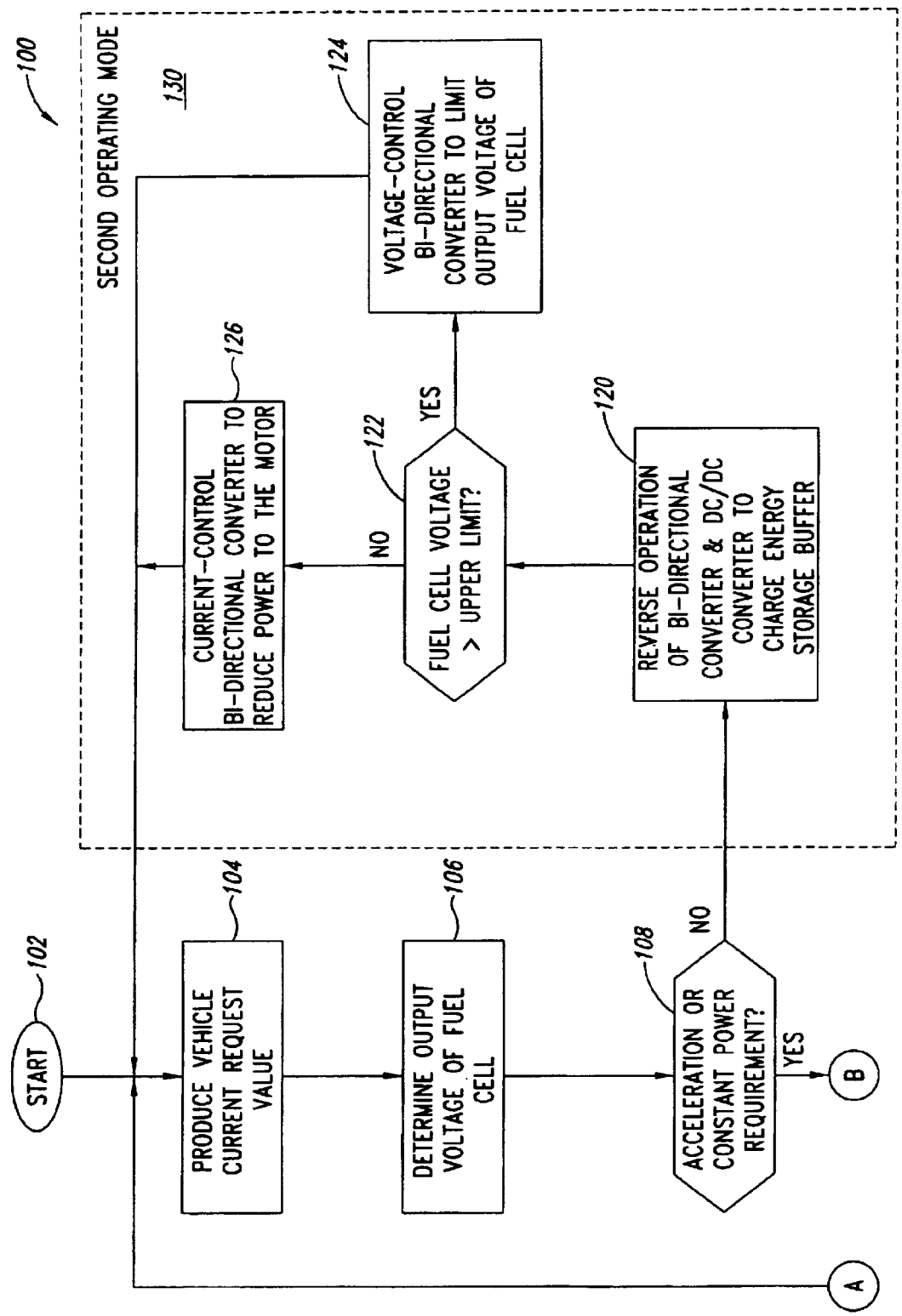
FIGS. 9A and 9B are a flow diagram of a method to regulate a supply of energy to an electric motor.
Figure 9B:
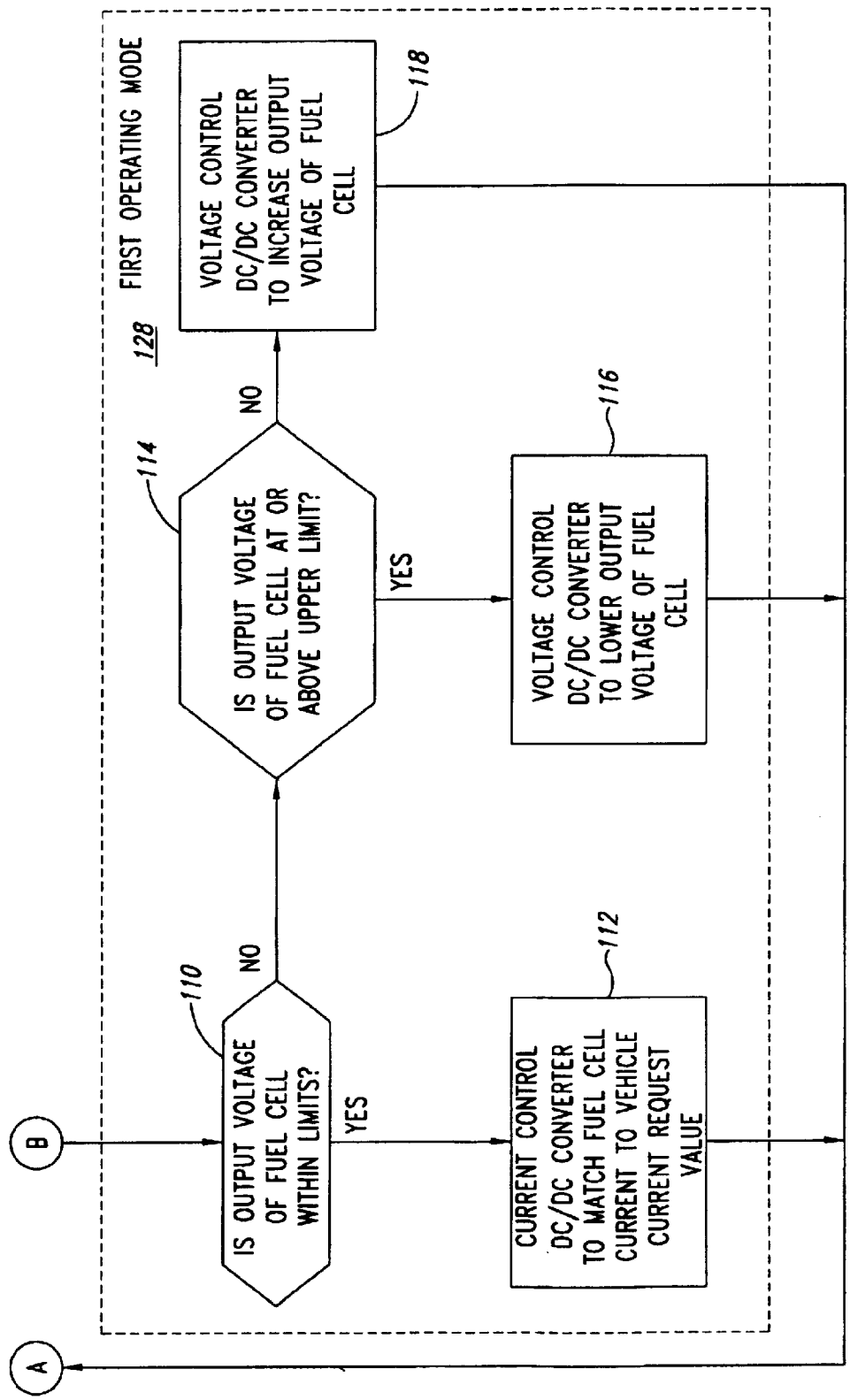

If the battery management system 20 has issued no charge/discharge request, then the fuel cell current is set to the value of the requested vehicle current. In this case the system management strategy is as follows:

FIGS. 9A and 9B are a flow diagram of a method 100 of regulating an energy supply to an electric motor according to one illustrated embodiment. The method 100 begins at act 102. At 104, a vehicle current request value is produced. At 106, the output voltage of the fuel cell is determined. At 108, the fuel cell control unit 9 determines whether the motor 6 is in a state of acceleration or constant speed, or a state of deceleration.

If a state of acceleration or constant speed is detected, the method 100 is in a first operating mode 128. At 110, the fuel cell control unit 9 determines whether the output voltage of the fuel cell 2 is between the upper and lower limit values. At 112, if the output voltage of the fuel cell 2 is between the upper and lower limit values, the DC/DC converter 8 is current-controlled so that the current supplied to the motor 6 by the fuel cell 2 is approximately equal to the vehicle current request value. At 114, the fuel cell control unit 9 determines whether the output voltage of the fuel cell 2 is at or above the upper limit value. At 116, if the output voltage of the fuel cell 2 is at or above the upper limit value, the DC/DC converter 8 is voltage-controlled to lower the output voltage of the fuel cell 2. At 118, if the output voltage of the fuel cell 2 is at or below the lower limit value, as determined in acts 110 and 114, the DC/DC converter 8 is voltage-controlled to raise the output voltage of the fuel cell 2.

If a state of deceleration is detected, the method 100 is in a second operating mode 130. At 120, the flow of current of the DC/DC converter 8 and the bi-directional converter 5 is reversed to charge the storage battery 3. At 122, the fuel cell control unit 9 determines whether the output voltage of the fuel cell 2 exceeds the upper limit value. At 124, if the output voltage of the fuel cell 2 exceeds the upper limit value, the bi-directional converter 5 is voltage-controlled to limit the output voltage of the fuel cell 2 to the upper limit value. At 126, if the output voltage of the fuel cell 2 is at or below the upper limit value, the bi-directional converter 5 is current-controlled to reduce power to the motor 6.

Figure 10A:
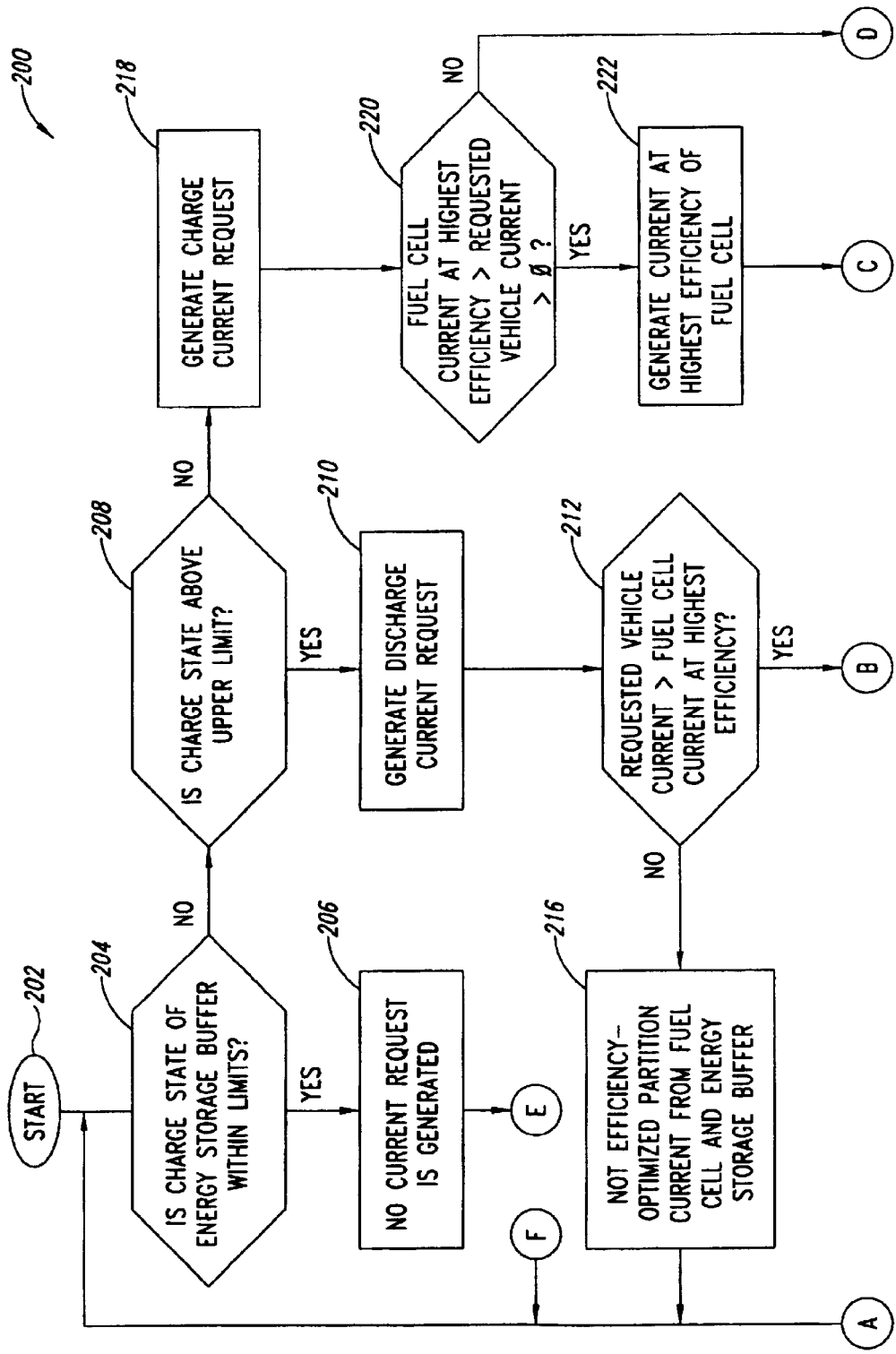
FIGS. 10A, 10B and 10C are a flow diagram of a method of regulating an energy supply to an electric motor based on a charge state of an energy storage buffer.
Figure 10B:
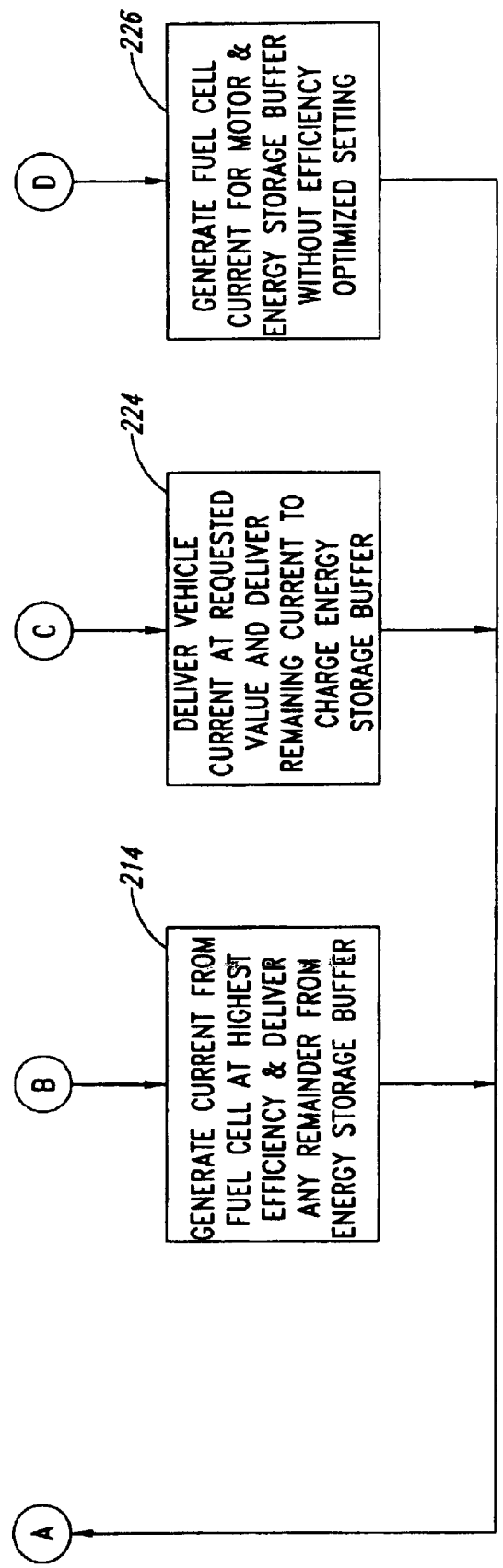
Figure 10C:
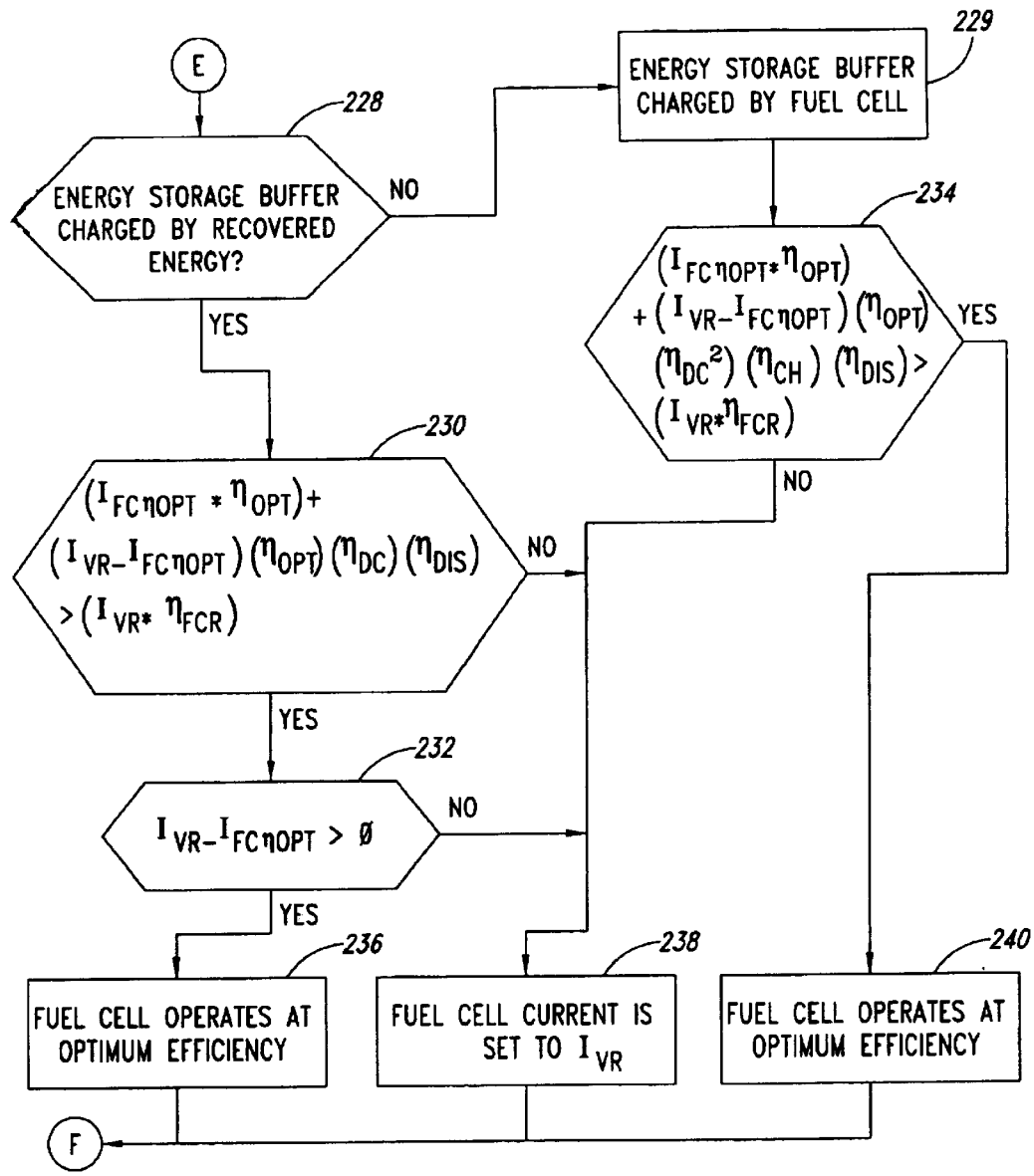

FIGS. 10A, 10B and 10C are a flow diagram of a method 200 of regulating an energy supply to an electric motor based on a charge state of a storage battery 3. The method 200 begins at act 202. At 204, the charge state of the storage battery 3 is determined. At 206, if the charge state is between the upper and lower charge state limit values, no current request is generated and control is passed to act 228. At act 228, it is determined whether the energy of the storage battery 3 is maintained by recuperating energy.

If the energy of the storage battery 3 is maintained by recuperating energy, one only takes the discharge efficiency of the storage battery 3 into account. At act 230, one determines the product of the fuel cell current at the optimum efficiency of the fuel cell 2 and the optimum efficiency of the fuel cell 2. Continuing in act 230, the result is added to the product of the difference between the requested fuel cell current and the fuel cell current at optimum efficiency of the fuel cell with the optimum efficiency of the fuel cell, the efficiency of the DC/DC convener 8, and the discharge efficiency of the storage battery 3. If this resulting value is larger than the product of the value of the requested fuel cell current and the efficiency of the fuel cell 2 for the requested fuel cell current, control passes to act 232. If the difference between the requested fuel cell current and the fuel cell current, at the optimum efficiency of the fuel cell is larger than zero, then the fuel cell current for which the fuel cell 2 has the highest efficiency is set in act 236. In the other cases, the fuel cell current is set to the requested value in act 238.

If it is determined in act 228 that the storage battery 3 is not maintained by recuperating energy, but instead is charged by the fuel cell 2, at 229, then the product of the fuel cell current at optimum fuel cell efficiency and the optimum efficiency of the fuel cell 2 is added to the product of the difference between the requested fuel cell current and the fuel cell current at optimum fuel cell efficiency, with the optimum fuel cell efficiency, the square of the DC/DC converter efficiency, the discharge efficiency, and the charge efficiency of the storage battery 3 in act 234. If this result is larger than the product of the requested fuel cell current and the efficiency of the fuel cell for this requested fuel cell current, then the requested fuel cell current is set to the current for which the fuel cell 2 operates at its highest efficiency in act 240. In all other cases, the fuel cell current is set to the value of the requested vehicle current in act 238. The above-described procedural steps are carried out in the module 45, i.e., in the fuel cell request modulation.

If the charge state exceeds an upper charge state limit value at act 208, a discharge current request is generated at act 210. At 212, if the discharge current request has been generated, it is determined whether the current that is required by the motor 6 is higher than the current generated by the fuel cell 2 at highest efficiency. If the current that is required by the motor 6 is higher than the current generated by the fuel cell 2 at highest efficiency, then at 214, current is generated at the highest efficiency by the fuel cell 2 and current is delivered from the storage battery 3 sufficient to make up the remainder of the vehicle current request value. At 216, if the current that is required by the motor 6 is smaller than the current generated by the fuel cell 2 at highest efficiency, the current required for the motor 6 is not efficiency-optimized partitioned between the fuel cell 2 and the storage battery 3.

If the charge state is below a lower charge state limit value, as determined in acts 204 and 208, a charge current request is generated at 218. At 220, if the charge current request has been produced, it is determined whether the current that is required by the motor 6 is greater than zero but smaller than the current generated by the fuel cell 2 at the highest efficiency: At 222, if the current required by the motor 6 is greater than zero but smaller than the current generated by the fuel cell 2 at the highest efficiency, current is generated at the highest efficiency by the fuel cell 2. At 224, the vehicle current request value is delivered to the motor 6, and the storage battery 3 is charged with the remaining current. If the motor 6 requires a current that is higher than the current delivered by the fuel cell 2 at the highest efficiency, at act 226, current is generated by the fuel cell 2 approximately equal to the vehicle current request value and the charge current for the storage battery 3 without any efficiency-optimized setting.

What is claimed is:

1. A method to regulate a supply of energy to an electric motor from a hybrid energy supply system that comprises at least one fuel cell, at least one energy storage buffer, a bi-directional converter electrically coupled between the fuel cell and the energy storage buffer, and a DC/DC converter electrically coupled between the bi-directional converter and the energy storage buffer, the method comprising:

producing a vehicle current request value based at least in part on a detected position of a throttle;

determining an output voltage of the fuel cell;

in a first operating mode, current controlling the DC/DC converter if the output voltage of the fuel cell is between an upper limit value and a lower limit value so that the current supplied to the electric motor by the fuel cell is approximately equal to the vehicle current request value;

voltage controlling the DC/DC converter if the output voltage of the fuel cell is at or below the lower limit value to raise the output voltage of the fuel cell to a level of at least the lower limit value, and voltage controlling the DC/DC converter if the output voltage of the fuel cell is at or above the upper limit value to lower the output voltage of the fuel cell, to a level not greater than the upper limit value.

2. The method of claim 1, further comprising:

in a second operating mode, reversing the flow of current of the DC/DC converter and the bi-directional converter to charge the energy storage buffer;

current controlling the DC/DC converter;

current controlling the bi-directional converter if the output voltage of the fuel cell is at or below the upper limit value to reduce power to the electric motor to a set point value; and voltage controlling the bi-directional converter if the output voltage of the fuel cell exceeds the upper limit value in order to limit the output voltage of the fuel cell to the upper limit value.

3. The method of claim 2 wherein the first operating mode corresponds to period of acceleration or constant power, and the second operating mode corresponds to a period of deceleration or regeneration.

4. The method of claim 2, further comprising:

determining the set point value based at least in part on the detected position of the throttle;

determining the vehicle current request value based at least in part on a voltage-current characteristic of the fuel cell;

providing the determined vehicle current request value from a vehicle controller to a fuel cell controller;

determining a fuel cell current request value based at least in part on an actual current delivered by the fuel cell, a current from the fuel cell available for the electric motor, and a charge state of the energy storage buffer;

providing the determined fuel cell current request value from the fuel cell controller to at least one actuator for at least one of an air metering system and a fuel metering system.

5. The method of claim 4 wherein determining a fuel cell current request value comprises:

summing the vehicle current request value with one of an energy storage buffer charge current value and an energy storage buffer discharge current value produced by an energy storage buffer controller;

modulating the sum of the vehicle current request value and the one of the energy storage buffer charge current value and the energy storage buffer discharge current value; and subsequently combining the modulated sum with a fuel cell correction current value, the result comprising the fuel cell current request value.

6. The method of claim 5, further comprising:

determining a difference between the actual current delivered by the fuel cell and the current from the fuel cell available for the electric motor;

forwarding the determined difference to PID control; and subsequently routing the resulting value with a time delay and a rate-of-change limitation as the fuel cell correction current value.

7. The method of claim 6, further comprising:

subtracting the fuel cell correction current value from the determined difference between the actual current delivered by the fuel cell and the current from the fuel cell available to the motor to produce an intermediate difference;

subtracting the intermediate difference with a time delay from the vehicle current request value; and applying the intermediate difference to at least one of the energy storage buffer charge current request value and energy storage buffer discharge current request value of the energy storage buffer controller and to an energy storage buffer correction current value to generate a setting value of the currents for the DC/DC converter.

8. The method of claim 7, further comprising:

applying a difference between the setting value of the current for the DC/DC converter and a limit setting value to the vehicle current request value.

9. The method of claim 4 wherein the fuel cell and the energy storage buffer are operated efficiency-optimized according to the following equation:

$$\eta_{OPT} = (\eta_{FC}^{SB})_{OPT},$$

whereby $\eta_{OPT}$ is the overall efficiency, $\eta_{FC}$ is the efficiency of the fuel cell, and $\eta_{SB}$ is the efficiency of the energy storage buffer.

10. The method of claim 2, further comprising:

determining an actual current of the fuel cell by measuring a current supplied to the bi-directional converter and summing the measured current supplied to the bi-directional converter with a current supplied by the energy storage buffer.

11. The method according to claim 10 wherein determining an actual current of the fuel cell, further comprises:

subtracting estimates of currents required by at least one other load in addition to the motor from the measured current.

12. The method of claim 2, further comprising:

determining a charge state of the energy storage buffer;

determining a temperature of the energy storage buffer;

providing one of a charge current request, a discharge current request and no current request to a fuel cell controller based on at least one of the determined charge state and the determined temperature; and providing a setting signal indicating one of the first and the second operating modes to control the DC/DC converter, wherein the setting signal is limited, based at least in part on the operating mode, to at least one of a preset maximum charge current value, a preset maximum discharge current value, and a preset maximum voltage value, where the maximum charge current value is subtracted from an available current value produced by the fuel cell controller and is provided to a vehicle controller as a minimum available current value, and where a maximum discharge current value is added to the available current value and is provided to the vehicle controller as the maximum available current in the first operating mode.

13. The method of claim 12, further comprising:
generating the discharge current request from the energy storage buffer controller if the charge state of the energy storage buffer exceeds an upper charge state limit value;
generating the charge current request from the energy storage buffer controller if the charge state of the energy storage buffer is below a lower charge state limit value; and
generating no current request if the charge state of the energy storage buffer is between the upper and the lower charge state limit values.

14. The method of claim 13, further comprising:
if the discharge current request has been provided and a current that is required by the electric motor is higher than a current generated by the fuel cell at a highest efficiency, generating current at the highest efficiency by the fuel cell and delivering current from the energy storage buffer sufficient to make up the remainder of the vehicle current request value; and
if the current required by the electric motor is smaller than the current generated at the highest efficiency, not efficiency-optimized partitioning the current required for the electric motor between the fuel cell and the energy storage buffer.

15. The method of claim 13, further comprising:
if the charge current request has been produced and a current required by the electric motor is greater than zero but smaller than a current generated by the fuel cell at a highest efficiency, generating current at the highest efficiency by the fuel cell and charging the energy storage buffer with a current that corresponds to the difference between the vehicle current request value and the current generated by the fuel cell at the highest efficiency; and
if the electric motor requires a current that is higher than the current delivered by the fuel cell at the highest efficiency, generating current by the fuel cell approximately equal to the vehicle current request value and the charge current for the energy storage buffer without any efficiency-optimized setting.

16. The method of claim 13 wherein in a charge state of the energy storage buffer without charge current request or discharge current request, if the energy storage buffer is being charged by recovered energy, and if the sum of a product of the fuel cell current at an optimum efficiency of the fuel cell and the optimum efficiency of the fuel cell and the product of a difference between the requested fuel cell current and the fuel cell current at the optimum efficiency of the fuel cell, with an optimum efficiency of the fuel cell, an efficiency of the DC/DC converter, and a discharge efficiency of the energy storage buffer is higher than a product of the value of the requested fuel cell current and an efficiency of the fuel cell for the requested fuel cell current, and if the difference between the requested fuel cell current and the fuel cell current at the optimum efficiency of the fuel cell is greater than zero, then the fuel cell generates the current at a highest efficiency, and in all other cases the fuel cell current will be set to the fuel cell current request value.

17. The method of claim 13 wherein in a charge state of the energy storage buffer without the charge current request or discharge current request, if the energy storage buffer is being charged by the fuel cell, and if a sum of a product of the fuel cell current at an optimum efficiency of the fuel cell with an optimum efficiency of the fuel cell and a product of a difference between the fuel cell current request value and a fuel cell current at the optimum efficiency of the fuel cell, with an optimum efficiency of the fuel cell, a square of an efficiency of the DC/DC converter, and a charge efficiency and a discharge efficiency of the energy storage buffer is higher than a product of the fuel cell current request value and the efficiency of the fuel cell for the fuel cell current request value, the fuel cell generates the current at the highest efficiency, and that in all other cases the fuel cell current will be set to the fuel cell current request value.

18. The method of claim 1 wherein the upper limit and the lower limit values are non-critical values for the operation of the fuel cell.

19. The method of claim 1, further comprising:
determining if the output voltage of the fuel cell is between the upper and the lower limit values.

20. An apparatus to regulate the energy supply of an electric motor and further loads using a hybrid energy supply system that comprises a fuel cell stack and an energy storage buffer; comprising:
a power bus electrically coupling the fuel cell stack to the electric motor;
a DC/DC converter electrically coupled between the power bus and the energy storage buffer;
a bi-directional converter electrically coupled between the power bus and the electric motor;
a voltage sensor electrically coupled across the fuel cell stack to determine a fuel cell stack output voltage;
a current sensor electrically coupled to the fuel cell stack to determine a fuel cell stack output current;
a throttle;
a position detector coupled to detect a position of the throttle;
a motor controller coupled to control the electric motor;
a vehicle controller configured to produce a current request value based at least in part on a position of the throttle and further configured to provide a setpoint to the motor controller;
a fuel cell controller coupled to receive the current request value from the vehicle controller, and to provide indications of an available vehicle current, a maximum vehicle current, and a minimum available vehicle current to the vehicle controller, the fuel cell controller further coupled to receive an indication of the fuel cell output voltage from the voltage sensor;
the motor controller, vehicle controller and fuel cell controller coupled and configured to,
in a first operating mode,
current control the DC/DC converter if the fuel cell stack output voltage is between an upper limit value and a lower limit value so that the current supplied to the electric motor by the fuel cell is approximately equal to the vehicle current request value;
voltage control the DC/DC converter if the fuel cell stack output voltage is at or below the lower limit value to raise the fuel cell stack output voltage to a level of at least the lower limit value, and
voltage controlling the DC/DC converter if the fuel cell stack output voltage is at or above the upper limit value to lower the fuel cell stack output voltage to a level not greater than the upper limit value; and
in a second operating mode,
reverse the flow of current of the DC/DC converter and the bi-directional converter to charge the energy storage buffer;

current controlling the DC/DC converter;

current controlling the bi-directional converter if the output voltage of the fuel cell is at or below the upper limit value to reduce power to the electric motor to the set point value; and voltage controlling the bi-directional converter if the output voltage of the fuel cell exceeds the upper limit value in order to limit the output voltage of the fuel cell to the upper limit value.

21. The apparatus of claim 20, further comprising:

an energy storage buffer controller coupled to provide a charge state value to the fuel cell controller, the charge state value indicative of a charge state of the energy storage buffer, wherein the fuel cell controller executes a current-management program that processes values of the fuel cell stack output current and of an estimated available fuel cell current as well as the charge state value to determine values to control at least one function of fuel cell operation.

22. An apparatus to regulate a supply of energy to an electric motor from a hybrid energy supply system that comprises at least one fuel cell, at least one energy storage buffer and a DC/DC converter electrically coupled between the fuel cell and the energy storage buffer, comprising:

means for producing a vehicle current request value based on a detected position of a throttle;

means for determining an output voltage of the fuel cell;

in a first operating mode, means for;

current controlling the DC/DC converter if the output voltage of the fuel cell is between an upper limit value and a lower limit value so that the current supplied to the electric motor by the fuel cell is approximately equal to the vehicle current request value;

voltage controlling the DC/DC converter if the output voltage of the fuel cell is at or below the lower limit value to raise the output voltage of the fuel cell to a level of at least the lower limit value, and voltage controlling the DC/DC converter if the output voltage of the fuel cell is at or above the upper limit value to lower the output voltage of the fuel cell to a level not greater than the upper limit value; and in a second operating mode, means for;

reversing the flow of current of the DC/DC converter and the bi-directional converter to charge the energy storage buffer;

current controlling the DC/DC converter;

current controlling the bi-directional converter if the output voltage of the fuel cell is at or below the upper limit value to reduce power to the electric motor to a set point value; and voltage controlling the bi-directional converter if the output voltage of the fuel cell exceeds the upper limit value in order to limit the output voltage of the fuel cell to the upper limit value.

\* \* \* \* \*

UNITED STATES PATENT AND TRADEMARK OFFICE
CERTIFICATE OF CORRECTION

PATENT NO. : 6,953,100 B2
DATED : October 11, 2005
INVENTOR(S) : Markus Aberle et al.

It is certified that error appears in the above-identified patent and that said Letters Patent is hereby corrected as shown below:

<u>Title page,</u>
Item [56], References Cited, FOREIGN PATENT DOCUMENTS,
"DE 100 24 296 C1 4/2002" should read as -- DE 100 24 296 C1 1/2002 --.

<u>Column 16,</u>
Lines 37-40, "$\eta_{OPT}=(\eta_{FC}^{SB})_{OPT.}$" should read as -- $\eta_{OPT}=(\eta_{FC}*\eta_{SB})_{OPT.}$ --.

Signed and Sealed this

Seventeenth Day of January, 2006

JON W. DUDAS
*Director of the United States Patent and Trademark Office*